(12) United States Patent
Sayag

(10) Patent No.: US 7,002,533 B2
(45) Date of Patent: Feb. 21, 2006

(54) DUAL-STAGE HIGH-CONTRAST ELECTRONIC IMAGE DISPLAY

(76) Inventor: Michel Sayag, 1820 Hackett Ave., Mountain View, CA (US) 94043

( * ) Notice: Subject to any disclaimer, the term of this patent is extended or adjusted under 35 U.S.C. 154(b) by 284 days.

(21) Appl. No.: 10/218,199

(22) Filed: Aug. 13, 2002

(65) Prior Publication Data

US 2003/0048393 A1   Mar. 13, 2003

Related U.S. Application Data

(60) Provisional application No. 60/313,147, filed on Aug. 17, 2001.

(51) Int. Cl.
   *G09G 3/36*   (2006.01)
(52) U.S. Cl. ............................. 345/7; 345/87
(58) Field of Classification Search ................ 345/638, 345/636, 634, 632, 629, 86, 7, 1.1; 359/619; 353/38; 349/11
See application file for complete search history.

(56) References Cited

U.S. PATENT DOCUMENTS

| | | | |
|---|---|---|---|
| 4,364,039 A | | 12/1982 | Penz |
| 4,476,465 A | * | 10/1984 | Anderson ................. 345/86 |
| 4,956,704 A | * | 9/1990 | Yamada ................... 358/538 |
| 5,200,844 A | * | 4/1993 | Suvada ..................... 349/11 |
| 5,491,525 A | * | 2/1996 | Yamasaki et al. ........ 353/98 |
| 5,726,670 A | * | 3/1998 | Tabata et al. .............. 345/7 |
| 5,727,860 A | * | 3/1998 | Broer et al. .............. 353/20 |
| 5,978,142 A | | 11/1999 | Blackham et al. |
| 6,042,237 A | * | 3/2000 | De Vaan et al. .......... 353/38 |
| 6,104,536 A | * | 8/2000 | Eckhardt ................. 359/619 |
| 6,341,869 B1 | | 1/2002 | Inami et al. |
| 6,473,209 B1 | | 10/2002 | Popovich |

\* cited by examiner

*Primary Examiner*—Guy Lamarre
*Assistant Examiner*—Fritz Alphonse
(74) *Attorney, Agent, or Firm*—Beyer Weaver & Thomas LLP

(57) ABSTRACT

Electronic displays are provided which can reproduce image data with high contrast ratios and a gray scale range comparable to conventional X-ray film viewed on a light box. One such display includes a rear low-resolution LCD or DLP display which projects an image onto a high-resolution LCD display. In such embodiments, the mechanical and optical registration between the two displays is not critical. Therefore, modulation transfer function and distortion of the projection optics are not critical. Accordingly, the brightness of the inventive display can be maximized with high power lamps and high aperture projection optics. Because the display has a high dynamic range, the need for dynamic range compression algorithms is reduced.

30 Claims, 8 Drawing Sheets

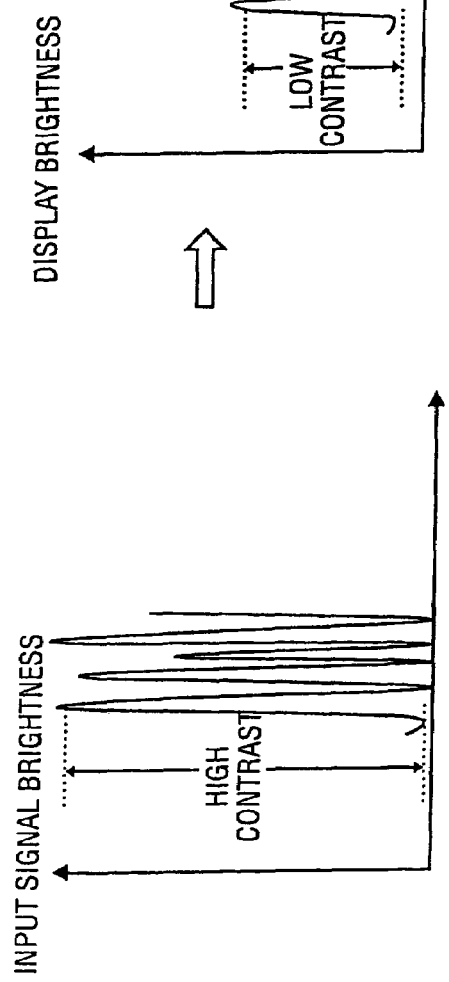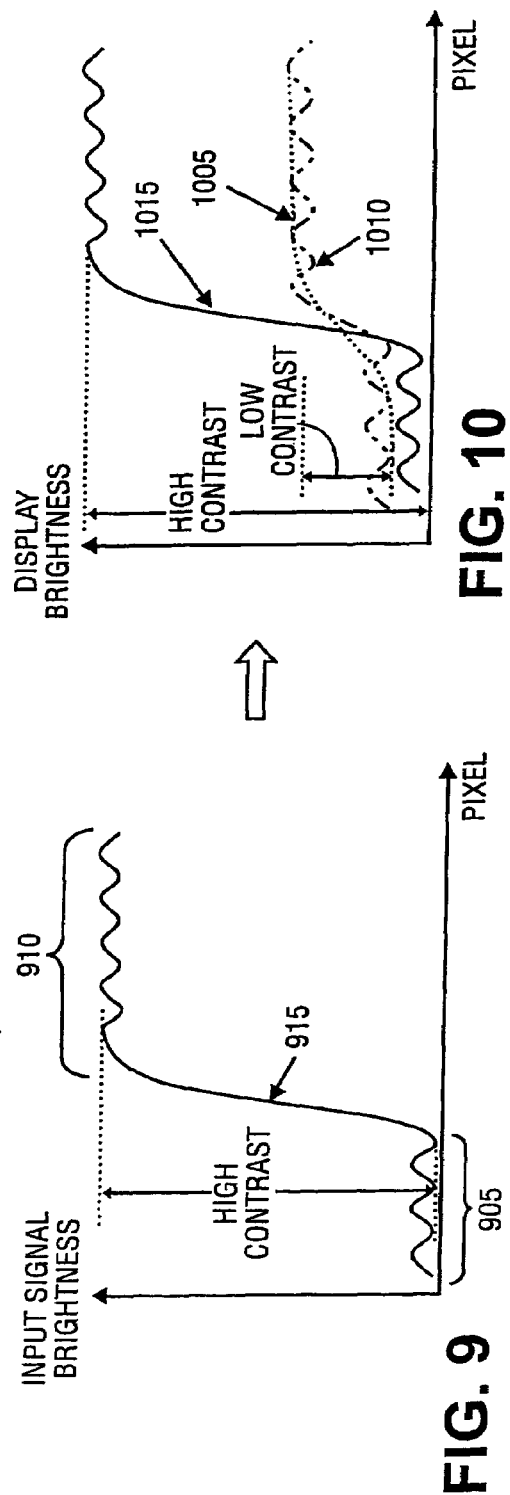

DUAL-STAGE HIGH-CONTRAST ELECTRONIC IMAGE DISPLAY

RELATED APPLICATIONS

This application claims priority to U.S. Provisional Patent Application No. 60/313,147, filed Aug. 17, 2001, which is hereby incorporated by reference for all purposes.

BACKGROUND OF THE INVENTION

The present invention is in the field of electronic image displays and more specifically relates to a method for fabricating high-contrast displays capable of reproducing digital radiography images.

In the last 20 years, tremendous improvements have been made in the image quality of cathode ray tubes and liquid crystal displays. Current displays are adequate for reproducing most color scenes, both as still images and video sequences (television). The spatial and temporal resolution of these electronic displays is commensurate with the resolution of the electronic capture devices (video and digital still cameras). The contrast ratio of these displays is also on par with the dynamic range of the electronic capture devices. Overall, these electronic displays compare favorably with non-electronic displays, such as photographic prints.

However, there are some applications for which electronic displays still cannot match the performance of traditional displays. One such application is radiography. Conventional radiography relies on silver halide films to capture, store and display X-ray images. A common use for radiography is medical diagnostic imaging. Chest X-rays (i.e. chest X-ray films), for instance, are used to capture and display 14"×17" radiographic images with high resolution, high brightness and very high contrast. The resolution and brightness of the best and most expensive electronic displays is approaching the resolution and brightness of X-ray films viewed on a light box. Unfortunately, the contrast ratio of a CRT or LCD display is still very low compared to the contrast ratio produced by an X-ray film. An X-ray film is capable of reproducing contrast ratios up to 10,000:1 (optical density range up to 4) while a CRT or LCD display is only capable of reproducing contrast ratios up to 700:1. This is a very serious technical limitation, which is slowing the adoption of digital radiography among physicians.

Since CRTs and LCD panels cannot display the same number of gray scale levels as a conventional X-ray film, some of the diagnostic information in the image can be lost in the display process. To alleviate this problem, special software algorithms have been developed to compress the gray scale range of digital radiographs to fit the gray scale range of CRT and LCD displays. CRT and LCD displays are not capable of reproducing, in a linear fashion, all the gray scale information available in a digital radiograph, but they can reproduce enough grayscale levels to display a radiograph with acceptable image quality. A number of image processing techniques can be utilized to compress the dynamic range of digital radiographs. However, extreme precautions must be taken to avoid any undesirable artifacts caused by the gray scale compression techniques. Such artifacts (e.g. undershoot) could hide actual clinical information in a radiograph. The most popular image processing technique consists of performing hierarchically repeated unsharp masking steps. This technique is referred to as nonlinear multiscale processing or multiscale image contrast amplification.

Regardless of the actual technique used, the original gray scale information of the image is manipulated and the resulting displayed image looks different from a conventional X-ray film. Some experts argue that more pertinent information is visible on the displayed digital radiograph than on the X-ray film, since the gray scale range is reduced and therefore easier to be perceived by the human eye. Other experts argue that most radiologists have been trained in medical schools to review and interpret X-ray films, not digital radiographs, and should therefore be presented digital radiographs which look as close as possible to X-ray films. In this case, it would be desirable to have an electronic display capable of reproducing very high-contrast images similar to conventional X-ray images produced on film. Having such displays would alleviate the need for gray scale compression techniques and would allow radiologists to look at digital radiographs the same way they look at film radiographs.

Different methods have been suggested to increase the contrast ratio of LCD displays. Perry Penz describes one such method in U.S. Pat. No. 4,364,039 ("Penz"). Realizing that a single LCD panel has an inherently low contrast ratio, Penz suggests stacking multiple LCD panels on top of each other. The contrast ratio (defined as the maximum brightness divided by the minimum brightness) is indeed increased when two LCD panels are stacked against each other; the resulting contrast ratio is the contrast ratio of the first panel multiplied by the contrast ratio of the second panel.

FIG. 1 illustrates the theory described by Penz. Imaging device 100 includes rear LCD panel 105 and front LCD panel 110. Both panel 105 and panel 110 have contrast ratios of 100 to 1. Pixels 115 are represented by rectangles, with bright pixels 120 depicted as empty rectangles and dark pixels 125 as filled rectangles.

Light rays 130 and 135 are ideal, perfectly collimated rays from a source located to the right of rear LCD panel 105. Brightest pixel 140 of panel 105 and brightest pixel 145 of panel 110 transmit ray 130 at 100% of its original intensity. Darkest pixel 150 transmits ray 160 at 1% of the intensity of ray 135. Darkest pixel 155 of panel 110 transmits ray 165 at 1% of the intensity of ray 160. Accordingly, there is a theoretical contrast ratio of 10,000 to 1 between brightest pixel 145 and darkest pixel 155 of panel 110.

Even though this method does achieve the desired goal of increasing the overall contrast ratio, it introduces a number of undesirable artifacts caused by the parallax of light traversing both of the stacked LCD panels. In order to achieve an enhanced contrast ratio between neighboring pixels and remain properly "registered" with its corresponding pixel on the front LCD panel, all the light traversing a pixel on the back LCD panel would have to traverse the corresponding pixel, but not its neighbors. This parallax issue is more than a simple alignment issue between the two LCD panels; it is a fundamental problem caused by the fact that the two LCD panels cannot be infinitely close to each other and the backlight cannot be perfectly collimated.

This parallax problem is also illustrated in FIG. 1. Ray 170 traverses dark pixel 175 of panel 105 and corresponding dark pixel 180 of panel 110. Therefore, pixels 175 and 180 are properly registered, as in the ideal case described above. However, ray 185 is not perfectly collimated and therefore does not traverse both bright pixel 190 and corresponding bright pixel 182 before reaching observer 195. Instead, ray 185 traverses bright pixel 190 and a portion of dark pixel 180. Similarly, ray 192 does not traverse bright pixel 194 and corresponding bright pixel 184. Instead, ray 192 traverses bright pixel 194 and a portion of dark pixel 180.

Therefore, pixel 190 is not properly registered with pixel 192 and pixel 194 is not properly registered with pixel 184.

Compounding this problem is the fact that in the real world, observer 195 is at a finite distance from the stacked display assembly and therefore sees different parts of the display from different angles, as shown in FIG. 2. Ray 200 passes through pixel 201 and corresponding pixel 202 before reaching observer 195. Accordingly, pixels 201 and 202 are properly registered. Pixel 206 corresponds with pixel 207, but ray 205 traverses pixels 206 and 208. Pixel 211 corresponds with pixel 212, but ray 210 traverses pixels 211 and 213.

Even if the parallax problem could be solved, the alignment problem would remain critical as far as creating a perfect registration between the pixels from the two LCD panels. It is clear that it would be desirable to have an electronic display capable of reproducing a very high contrast ratio but without the parallax and alignment problems mentioned above.

SUMMARY OF THE INVENTION

Some embodiments of the present invention provide an electronic display device capable of reproducing very high contrast ratios without objectionable parallax artifacts. These devices include at least two displays, wherein pixels of a first display are projected onto corresponding pixels of a second display. Some aspects of the invention provide simple and inexpensive methods for reproducing, on electronic displays, image data having very high contrast ratios. Still further specific embodiments of the invention provide radiologists and physicians a film-like electronic display with a gray scale range comparable to that of a conventional X-ray film viewed on a light box.

Some display devices of the present invention include: a first display disposed in a first plane, having a first area and configured to generate a first image based upon first image data; a second display disposed in a second plane, having a second area and configured to generate a second image based upon second image data; and a projection device for projecting the first image substantially into the second plane, thereby superimposing a projected image and the second image.

Some display methods of the present invention include the following steps: generating a first image on a first display based upon first image data; generating a second image on a second display based upon second image data; and projecting the first image substantially into the second plane thereby superimposing a projected image and the second image.

According to some embodiments of the invention, a display apparatus includes: a filter for filtering high spatial frequency data and low spatial frequency data from image data; a first liquid crystal display panel disposed in a first plane, having a first area and configured to generate a first image based upon low spatial frequency data received from the filter; a second liquid crystal display panel disposed in a second plane parallel to the first plane, having a second area larger than the first area and configured to generate a second image based upon high spatial frequency data received from the filter; a light source for illuminating a first side of the first liquid crystal display panel; and a projection device disposed proximate a second side of the first liquid crystal display panel for projecting the first image and focusing the first image on the second plane.

Other embodiments of the present invention provide a display apparatus which includes: a filter for filtering high spatial frequency data and low spatial frequency data from image data; a reflective digital light processing device having a first area and configured to generate a first image based upon low spatial frequency data received from the filter; a light source for illuminating a first side of the reflective digital light processing device; a transmissive liquid crystal display panel having a second area larger than the first area and configured to generate a second image based upon high spatial frequency data received from the filter; and a projection device for projecting a first image from the reflective digital light processing device and for focusing the first image into a plane within which the transmissive liquid crystal display panel is disposed.

Some display methods of this invention include the following steps: filtering high spatial frequency data and low spatial frequency data from image data; displaying a first image based upon the low spatial frequency data; displaying a second image on a liquid crystal display based upon the high spatial frequency data; and projecting the first image onto the liquid crystal display such that pixel data from the first image are registered with corresponding pixel data from the second image.

Other aspects and embodiments of the present invention will appear more fully from the following description.

BRIEF DESCRIPTION OF THE DRAWINGS

FIG. 7 is a graph that indicates the pixel intensities of an input signal having a relatively high spatial frequency and high contrast.

FIG. 8 is a graph that indicates the pixel intensities of a display device according to an embodiment of the present invention when the signal depicted in FIG. 7 is an input signal.

FIG. 9 is a graph that indicates the pixel intensities of an input signal having a range of spatial frequencies and contrast typical of an X-ray image.

FIG. 10 is a graph that indicates the pixel intensities of a display device according to an embodiment of the present invention when the signal depicted in FIG. 9 is an input signal.

DETAILED DESCRIPTION OF THE PREFERRED EMBODIMENTS

According to a first embodiment, the invention comprises a dual display system in which two panels of identical spatial resolution are imaged one onto the other. The same electronic data (e.g. video signal or digital image file) are sent to both displays. Because of the multiplicative effect of cascaded displays, the contrast ratio of the combined display is a product of the contrast ratios of the front and rear panels. Rather than having two panels of the same size, some embodiments have a smaller panel (for example, a rear-projection LCD panel) that is imaged onto a larger panel through a projection lens. Preferably, both the smaller and the larger panels have the same number of total pixels.

Figure 1:
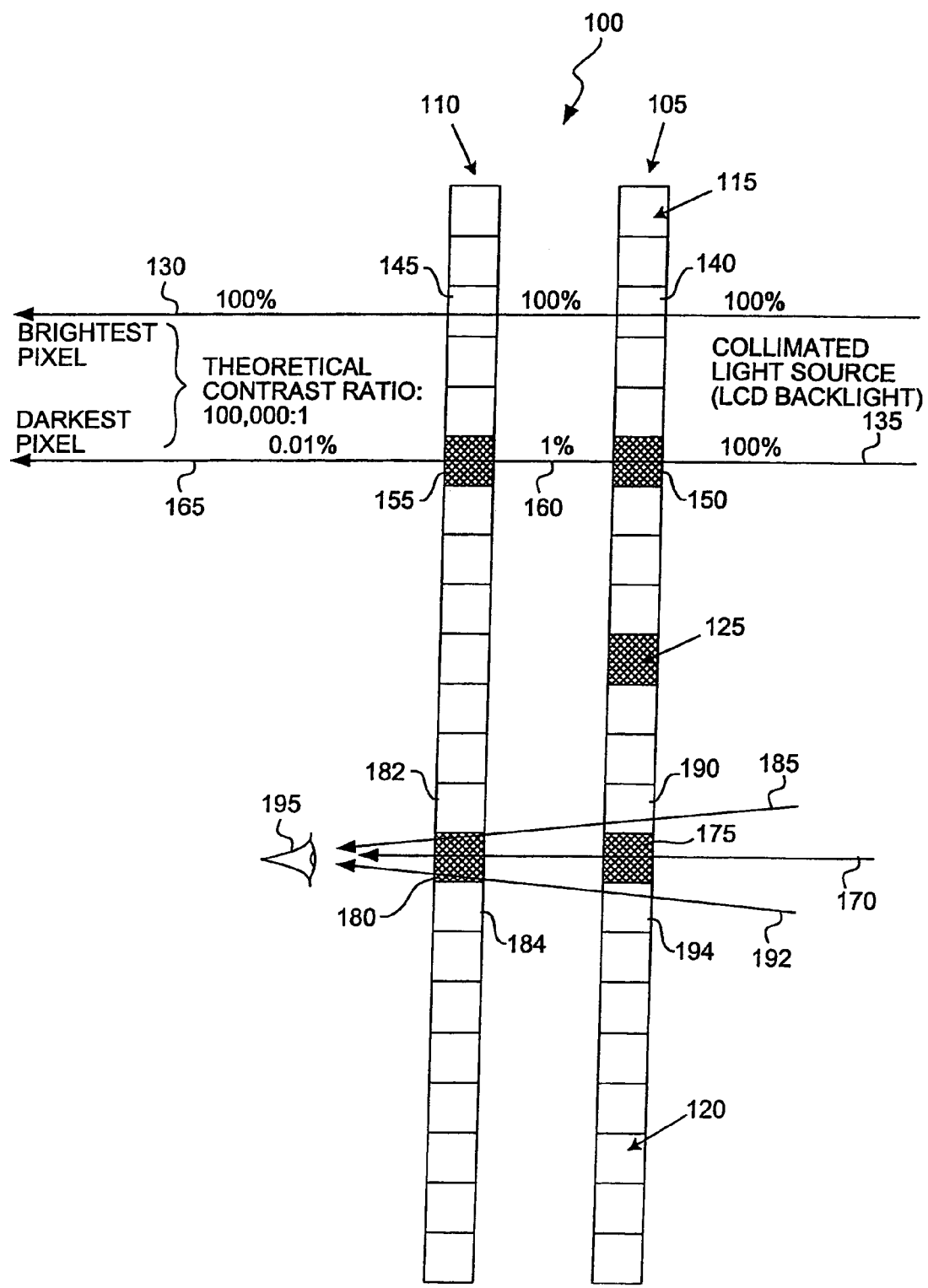
FIG. 1 depicts a theoretical dual display device.
Figure 2:
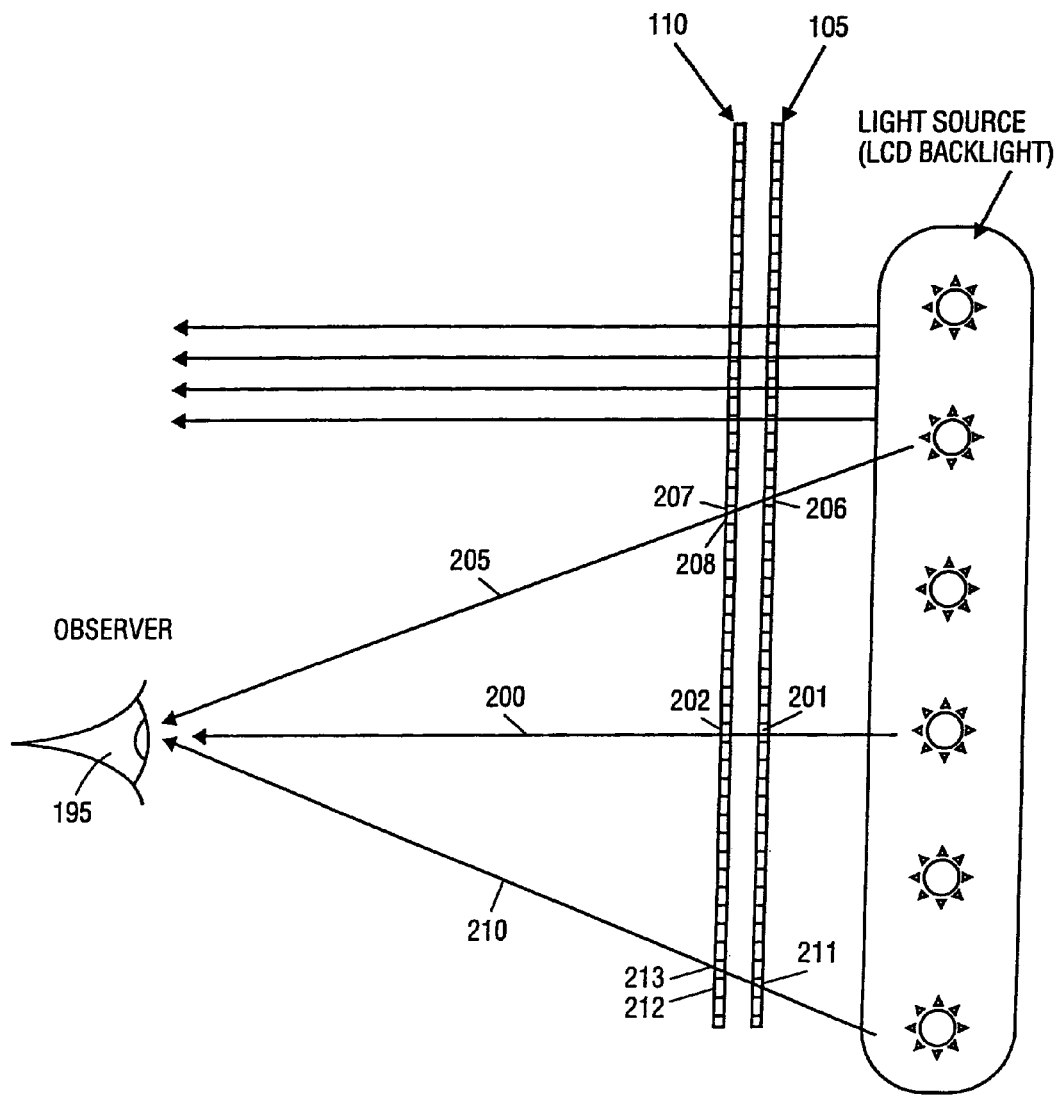
FIG. 2 depicts a prior art dual display device.
Figure 3:
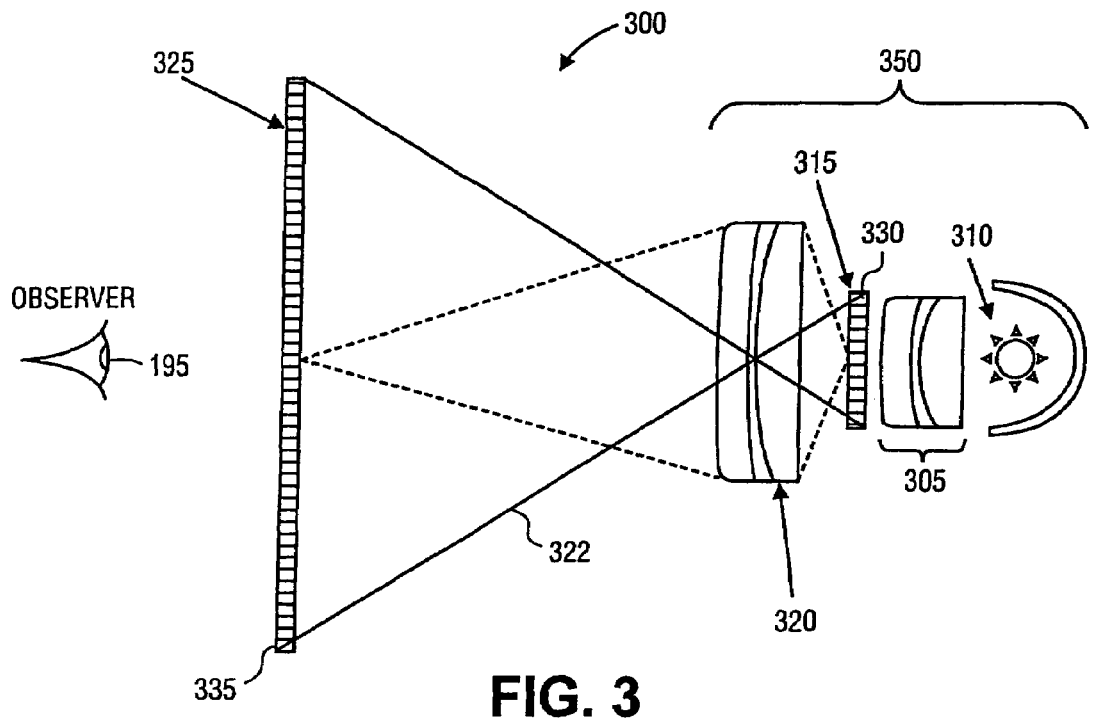
FIG. 3 depicts a display device according to an embodiment of the present invention.

Such an embodiment is illustrated in FIG. 3. Display device 300 includes lens assembly 305, which directs light from light source 310 to rear display 315. Projection lens assembly 320 focuses light from pixels of rear display 315 to corresponding pixels of front display 325. For example, light ray 322 emanates from pixel 330 of rear display 315 and projection lens assembly 320 focuses light ray 322 on pixel 335 of front display 325. Since the image of rear display 315 is focused onto the plane of front display 325, it is as if both panels were physically in the same plane and most of the parallax issue disappears.

Light source 310 is preferably a bright source such as a metal-halide lamp. In one embodiment, light source 310 is a halogen lamp. However, a lower-intensity light source, such as a cold cathode fluorescent tube, may be used as light source 310. Lens assembly 305 may be any convenient combination of optical elements for directing light to rear display 315, but preferably lens assembly 305 includes a condenser lens.

In some preferred embodiments, rear display 315 and front display 325 are transmissive LCD panels. However, any electronic panel with similar properties (i.e., wherein the transmissivity of areas of the panel may be electronically varied) may be used instead of an LCD panel. In one embodiment of display device 300, front display 325 is a modified direct-view LCD panel. Such panels are typically 15" to 22" in size, but front display 325 may be any convenient size. Computer projector 350 replaces the backlight of a standard direct-view LCD panel and projects its image from display 315 onto the backside of front display 325. Front display 325 may be, for example, an L.G. Philips 5 million pixel LCD display (e.g., model LB209F1) or an IBM 20.8" 3 million pixel QXGA monochrome unit.

According to a second embodiment, rear display 315 is not transmissive, but instead is reflective. The principle remains the same: the projected image from rear display 315 is focused onto front display 325 in lieu of the traditional backlight.

Figure 4:
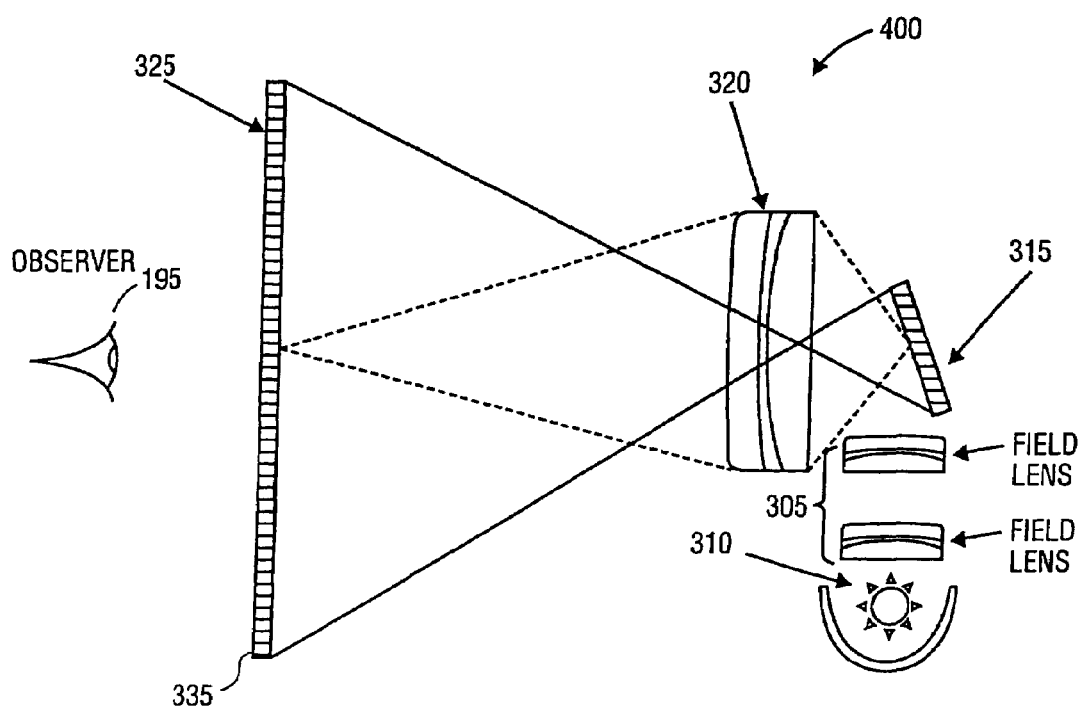
FIG. 4 depicts a display device according to another embodiment of the present invention.

This second embodiment is illustrated in FIG. 4. Display device 400 includes lens assembly 305, which directs light from light source 310 to rear display 315. Projection lens assembly 320 focuses light from pixels of rear display 315 to corresponding pixels of front display 325, as described above. As shown in FIG. 4, lens assembly 305 preferably includes one or more field lenses.

In such embodiments, rear display 315 preferably includes a digital light processing ("DLP") device, also known as a digital micromirror device ("DMD"). A DLP is a chip that may include from 800 to more than 1 million mirrors. Each mirror rests on support hinges and electrodes, which allow each mirror to be controlled independently of the other mirrors. When a voltage is applied to the electrodes, the mirrors can tilt (typically by about +/−10 degrees). Light from light source 310 that reflects from an "on" mirror will reflect through projection lens assembly 320 to front display 325. Light that reflects from an "off" mirror will not reach front display 325. Rear display 315 may also be, for example, any SVGA (or higher resolution) LCD projector, especially if it uses a reflective type LCOS (Liquid Crystal On Silicon) device.

As mentioned previously in this disclosure, even the most expensive CRT or LCD display cannot reproduce a gray scale range comparable to that of X-ray film. The state of the art is 4,096 gray levels (12-bit data) for CRT displays and only 1,024 gray levels (10-bit data) for LCD displays. To reach such a level of performance, very sophisticated addressing electronics are required as well as the use of a nonstandard computer interface board. Examples of such high-contrast grayscale CRT monitors are Siemens SMM 21200P, BARCO MGD 521 and Dataray DR120. Examples of high-contrast LCD monitors are Dome C3 and C5, Barco MFGD 3220 and National Display Systems NIX-QX21. An example of a nonstandard computer interface board is Dome Md8/PCI display controller.

With the present invention, the gray scale requirements of rear display 315 and front display 325 are drastically reduced as compared to the gray scale requirement for a single-display system. For example, the combination of an 8-bit LCD display (256 gray levels) for front display 325 and an 8-bit rear LCD (or DLP) display for rear display 315 is sufficient to produce an image with at least 10,000 gray levels (theoretically up to 65,536 gray levels). Because 8-bit LCD displays and projectors are standard components for the personal computer industry, they are manufactured in very large quantities and their cost is at least one order of magnitude lower than medical grade high-contrast displays (approximately $1,500 vs. $15,000).

Similarly, 8-bit computer interface boards are commodity items in personal computers and their cost is almost two orders of magnitude lower than medical grade 12-bit computer interface boards (approximately $100 vs. $8,000). The cost of combining a standard LCD display with a standard projector can be lower than the cost of a nonstandard high-contrast monitor and a 12-bit computer interface board.

Although the foregoing embodiments can provide a low-cost electronic display with greatly increased brightness and contrast, further refinement is required to address fully the shortcomings of the prior art. The projection methods and devices described above alleviate most of the parallax problems of the prior art but do not fully resolve the problem of aligning corresponding pixels of the two displays. In fact, projection lens assembly 320 may create new challenges for the accurate registration of pixels between rear display 315 and front display 325. Projectors often have residual distortion that essentially changes the grid pattern of the pixels in the projected image plane. If the pixel grid patterns of rear display 315 and front display 325 are different, it becomes extremely difficult to accurately register pixels from one display with pixels from the other. The optical distortion can be corrected by image processing but registration remains a difficult problem to correct.

Some embodiments of the present invention that alleviate most of these registration problems include devices which project a lower spatial frequency image onto a display of a higher spatial frequency image. In some such embodiments, a low-resolution rear display 315 (LCD or DLP projection display) projects its image on the backside of a high-resolution front display 325, preferably a transmissive LCD display. In some such embodiments, each display receives different image input data.

Figure 5:
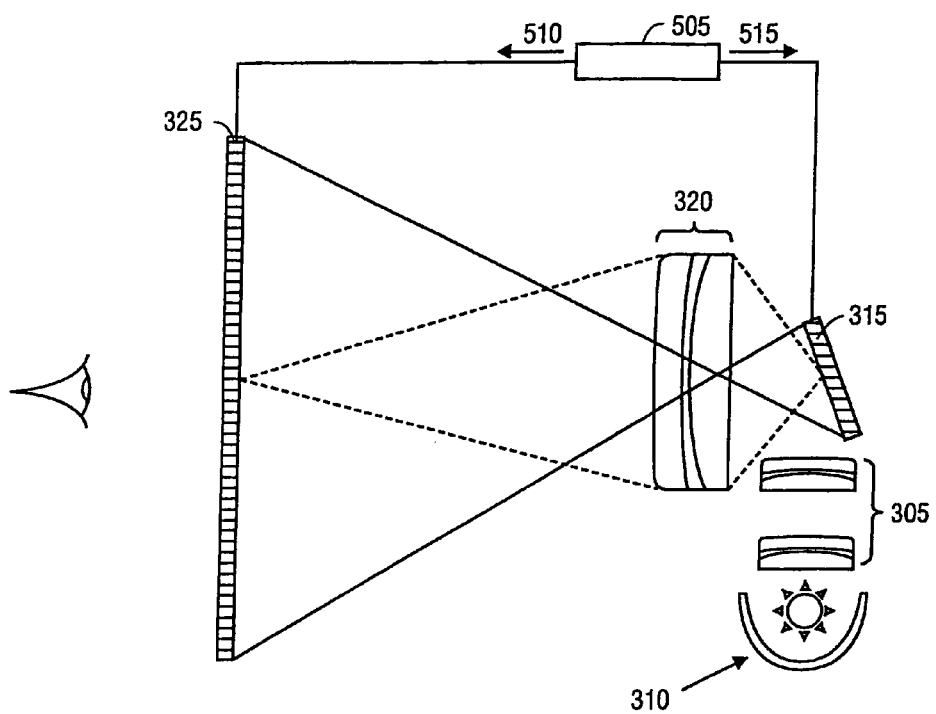
FIG. 5 depicts a display device according to a third embodiment of the present invention.

One such embodiment is schematically depicted in FIG. 5. Display device 500 includes filter 505, which filters out high spatial frequency components 510 and low spatial frequency components 515 of input image data. Preferably, there is some overlap between the high spatial frequency and low spatial frequency components. Filter 505 transmits high spatial frequency components 510 to front high-resolution display 325 and transmits low spatial frequency components 515 to low-resolution rear display 315. Filter 505 may include any filter known in the art, such as a processor with associated software for performing filtering operations. Although display device 500 includes the components of display device 400, filter 505 (or any other convenient filtering device) may be used in combination with other embodiments of the present invention, such as display device 300.

Filter 505 may employ a variety of methods for filtering out the low and high spatial frequency contents of the original image. For example, low-pass spatial filtering can be performed in the analog domain (e.g., using video filters) or in the digital domain (e.g., by digital image processing software or hardware). High-pass spatial filtering may be performed, for example, by subtracting the low-pass filtered image from the original image. As noted below, filter 505 may include an optical filter, an electronic analog or digital filter, or any combination of such filters.

In the case where electronic filtration is needed, numerous techniques are available: analog electronic filters can be made using passive components (network of resistors and capacitors), digital electronic filters can be implemented in hardware, firmware or software. Such digital filters generally rely on simple convolution kernels, i.e. the replacement of a given pixel value by the weighted average of the given pixel value and its neighboring pixels. The number of neighboring pixels using the computation and the relative weight of each pixel value defines the size and characteristics of the convolution kernel.

In embodiments wherein a low spatial frequency image is projected onto front display 325, accurate pixel registration between the two displays is not required. This feature brings considerable simplification and cost reduction to the complete display assembly. The reason accurate pixel registration between the two displays is not required is that the image projected by rear display 315 is a low-resolution image compared to the image displayed on front display 325. The image projected by rear display 315 does not contain any high-resolution information and therefore does not interfere with the high-resolution information displayed on front display 325. A coarse registration between the two displays is still required, so as to superimpose the low-resolution information from rear display 315 with the residual low-resolution information from front display 325. However, this coarse registration is much easier to perform than an accurate pixel registration between the two displays. Another way to describe this embodiment is to refer to the rear display (or the projection of the rear display) as the "low spatial frequency image formation stage" and the front display as the "high spatial frequency image formation stage."

Figure 6:
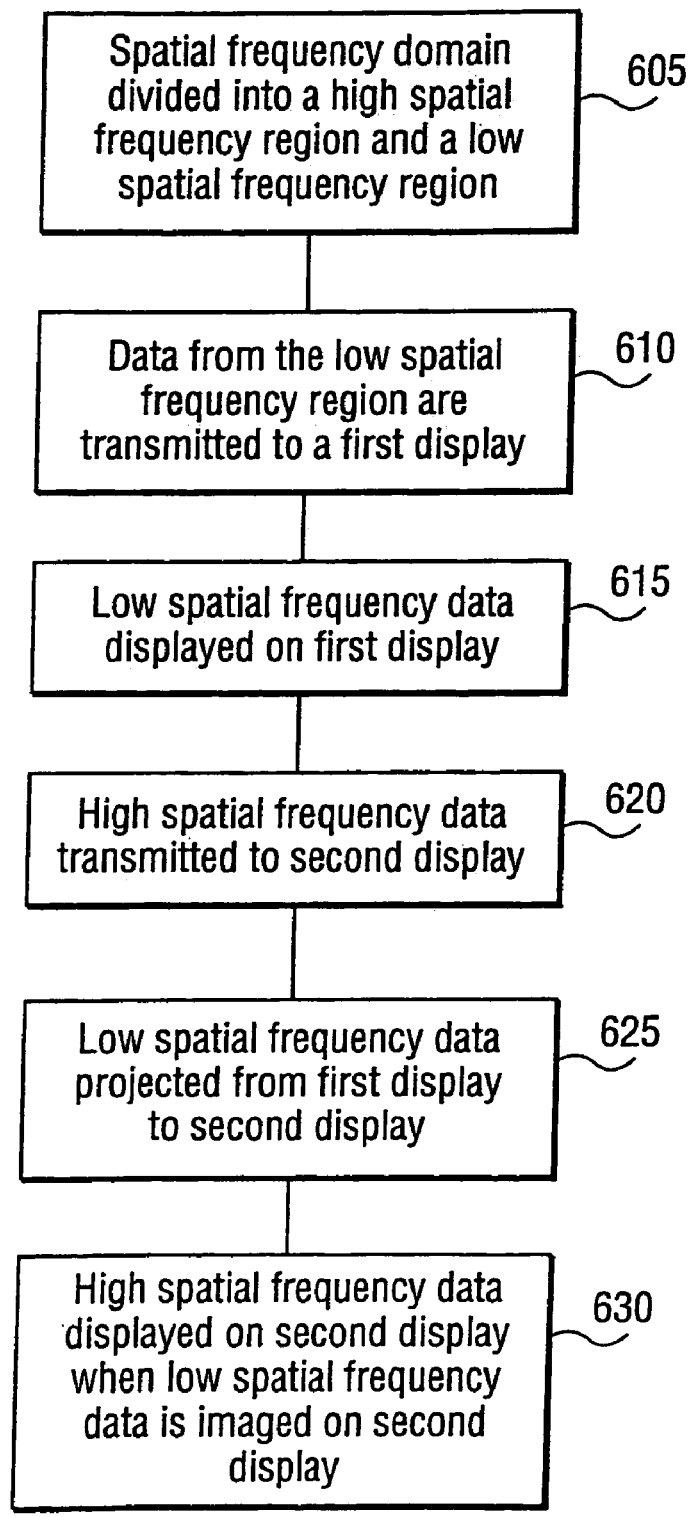
FIG. 6 depicts a method according to an aspect of the present invention.

FIG. 6 illustrates a method according to one aspect of the present invention. In step 605, the spatial frequency domain of the image to be displayed is electronically divided into two regions, a high spatial frequency region and a low spatial frequency region. According to preferred aspects of this method the regions are overlapping, but this need not be the case. In step 610, data from the low spatial frequency region are transmitted to a first display. In step 615, the low spatial frequency data are displayed on the first display. In step 620, data from the high spatial frequency region are transmitted to a second display. In step 625, the low spatial frequency data are projected from the first display to a transmissive second display. In step 630, the high spatial frequency data are displayed on the second display at the same time the low spatial frequency data are imaged on the second display. Those of skill in the art will understand that the sequence of steps 610 through 630 is not important, so long as the high spatial frequency data are displayed on the second display at the same time the low spatial frequency data are imaged on the second display.

Figure 6B:
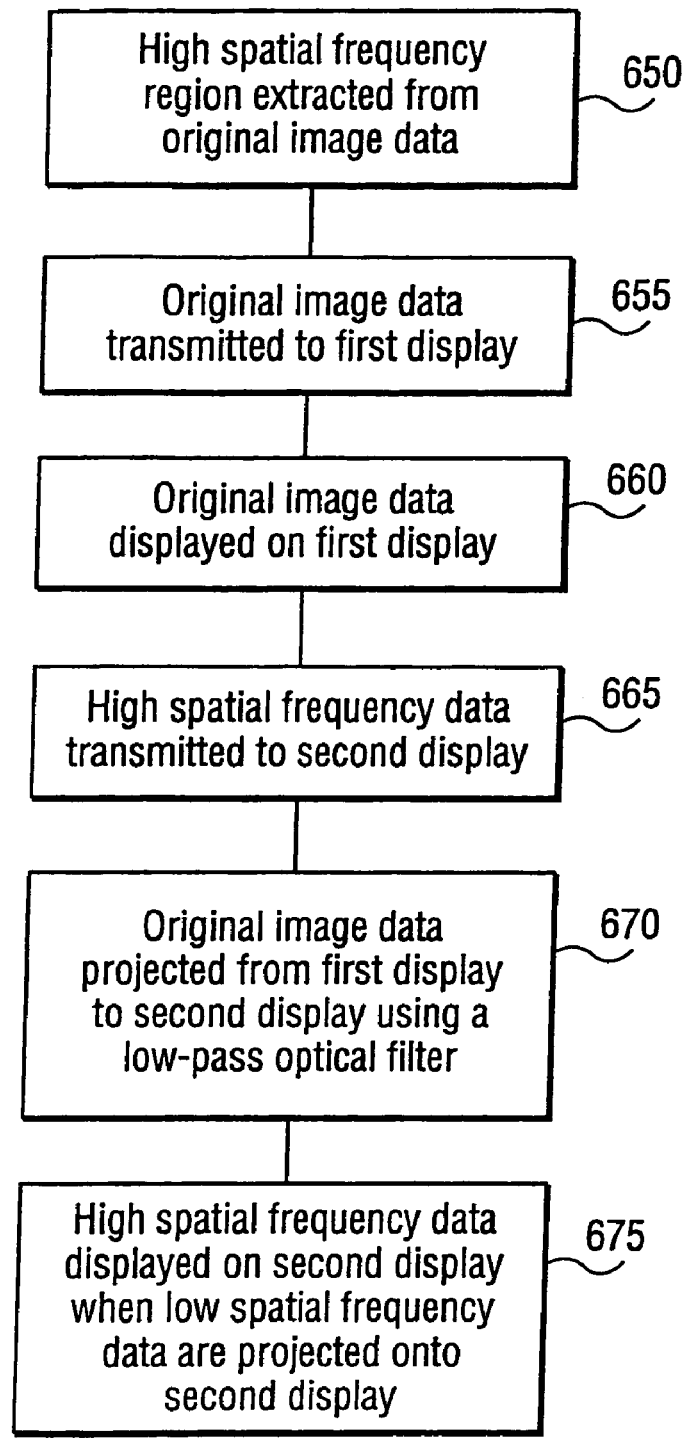
FIG. 6B depicts a method according to an alternative aspect of the present invention.

FIG. 6B illustrates one method of combining optical and digital filtering according to the present invention. In step 650, a region of high spatial frequency data is extracted from original image data. In step 655, original image data are transmitted to a first display, such as rear display 315, and in step 660 the original image data are displayed on the first display. In step 665, the extracted high spatial frequency data are transmitted to a second display, such as front display 325.

In step 670, an optical low-pass filter is used to project the image from the first display to the second display. Low pass spatial filtering can be performed in the optical domain by using a projection lens assembly with low contrast at high spatial frequencies (low MTF). According to some aspects of the invention, step 670 is performed by slightly defocusing projection lens assembly 320. In some such aspects, step 670 is performed by focusing the projected image within the plane occupied by a diffusing element adjacent to front display 325. Such a diffusing element will be described below with reference to FIG. 11. In alternative aspects of the invention, step 670 is performed by adding birefringent or diffusing elements within projection lens assembly 320 or elsewhere in the optical path. In a case where optical low pass filtering is used, no electronic (digital or analog) low pass filtering is needed.

Finally, in step 675, high spatial frequency data are displayed on the second display at the same time the low spatial frequency data are projected onto the second display. Those of skill in the art will understand that the sequence of steps 650 through 670 is not important, so long as the high spatial frequency data are displayed on the second display at the same time the low spatial frequency data are projected onto the second display.

As mentioned previously, mechanical registration between the two displays is not critical because there is little overlap between information displayed by the rear display and by the front display. Another very important benefit of such embodiments is the fact that the optical quality of projection lens assembly 320, which projects the low spatial frequency image displayed on the rear display onto the backside of the front display, does not have to be high. Since projection lens assembly 320 does not need to accurately conjugate a pixel from the rear display onto a pixel from the front display, its distortion can be quite high without significantly impacting the quality of the displayed image. Projection lens assembly 320 is only projecting low spatial resolution information and therefore does not need to perform very well at high spatial frequencies. Therefore, a simple and inexpensive projection lens can be constructed with a relatively low MTF (modulation transfer function). As noted above, the MTF of the projection lens may even be intentionally lowered to create an optical low-pass filter in lieu of, or in addition to, an electronic low-pass filter 505. This optical low-pass filter can also eliminate any residual pixel structure in the projected image.

In one exemplary embodiment, rear display 315 is a relatively low-resolution VGA panel having 480 pixels by 640 pixels. Front display is a high-resolution QUSGA-W panel having 2400 pixels by 3840 pixels. Projection lens assembly 320 is only projecting low spatial resolution information and therefore can be constructed with a relatively low MTF. In this example, projection lens assembly 320 has an MTF capable of accurately resolving a 480 pixel by 640 pixel image, but with an MTF which is not high enough to accurately resolve a 2400 pixel by 3840 pixel image.

Another benefit of this invention is that it provides a high-contrast display with very high brightness. Projection lens assembly 320 may have a very high aperture (e.g., in the range of approximately f/4 to f/1), since MTF and distortion specifications are not critical. The high aperture provides efficient light throughput between the light source and the front LCD panel. With high aperture projection optics, the brightness of the display is maximized.

Another way to increase the brightness of the display is to increase the power of the light source. The amount of light available from a projector is much greater than from conventional backlights: projectors utilize metal-halide lamps whereas backlights utilize cold cathode fluorescent tubes. Projectors are designed to display images on a large screen so the power of their light source is calculated accordingly. If one utilizes an off-the-shelf projector and projects the image on a 20" front panel 325, the brightness of the combined display will be exceptionally high. It is therefore possible to provide a dual stage high-contrast display with a maximum brightness approaching the brightness of a light box (over 2,000 nits).

In addition to the cost advantage, there are technical advantages of using the present invention. Firstly, the gray scale range of the dual-stage monochrome display is significantly higher than that of a conventional monochrome LCD display (10,000:1 or more vs. approximately 1,000:1). Secondly, the spatial resolution of a monochrome dual-stage display can be three times higher than a conventional monochrome LCD display.

This is true because commercially available monochrome LCD displays are actually color LCD displays in which the color filters have been omitted: the market for monochrome displays is too small to warrant a specific manufacturing tool. Since each pixel of a color LCD display consists of three sub pixels (one red, one green, one blue), the actual number of addressable sub pixels is three times the number of color pixels. In a single display design, the three sub pixels are addressed as one pixel in order to increase the gray scale range: each sub pixel can display 256 gray levels so a group of three sub pixels can display 768 gray levels. In a dual stage display design, the three sub pixels can be addressed separately since there is no need to increase the gray scale range. The effective number of addressable pixels is tripled and the spatial resolution is therefore enhanced.

Implementing this technique does not require any additional electronics and can be done using standard off-the-shelf computer interface boards. The addressing of the three monochrome sub pixels is done by creating a 24-bit/pixel file format where 8-bit/sub pixel data replace the 8-bit color data.

Some DLP projectors, such as the Infocus LP330, use only one DLP device (instead of three) and a rotating color filter wheel to produce color images (sequential color technique). For example, in a projection television that includes a DLP, each frame of a video is separated into its red, blue, and green components and digitized into a large number of samples for each color. Each mirror in the DLP is controlled by one of these samples. A full-color picture is projected onto the television screen by using a color filter wheel between the light source and the DLP, while varying the amount of time each mirror pixel is in the "on" position. Since digital radiography applications do not require color displays, it is particularly easy to convert this type of color projector into a monochrome projector by simply removing the rotating color filter wheel.

Because the gray scale range of the inventive electronic display is much wider than that of conventional displays, less image processing (i.e. dynamic range compression) is required to display the relevant information of the image. As mentioned previously, current digital radiography systems (which all utilize conventional CRT or LCD displays) rely heavily on image processing software to compress the dynamic range of the digital radiograph in order to fit within the dynamic range of the display. With the present invention, the dynamic range compression (a.k.a. multiscale compression) can be eliminated since the dual stage display expands the dynamic range of the displayed image to the level of the original image.

To illustrate this concept, the following analogy can be made. Before audio compact discs (CDs) became ubiquitous, cassettes and tapes were used to reproduce recorded music. Since the dynamic range of cassettes and tapes was not high enough, compression circuits were introduced. The most popular compression circuit was invented and marketed by Dolby. Today however, such compression circuits are obsolete because the dynamic range of audio CDs is sufficiently high to capture and reproduce most musical recordings.

Some implementations of a dual stage high-contrast electronic display designed according to the invention have certain technical limitations that make them undesirable for some display applications, but perfectly adapted for some other applications. The method of dividing the spatial frequency information of an image into two regions and cascading a display with the low spatial frequency information with another display with the high frequency information is not applicable for all types of images. For instance, this method will not work well for images with high contrast ratios at high spatial frequencies.

This limitation is illustrated in FIGS. 7 and 8. FIG. 7 illustrates an input signal having a relatively high spatial frequency and high contrast ratio. FIG. 8 illustrates the display brightness resulting from using the input signal depicted in FIG. 7 in one embodiment of a dual-stage display according to the present invention, wherein a low. A comparison of FIGS. 7 and 8 reveals that the displayed image has substantially lower contrast than the input signal. Such embodiments of the dual stage display will not be able to reproduce high contrast ratios at high spatial frequencies because image data from the rear display includes only low spatial frequency information.

This may seem like a serious limitation, but in reality, very few images exhibit such characteristics. Besides, such images do not need to be displayed in their raw form and can be easily compressed without any loss of information. In fact, if such images were displayed on ideal displays, the observer would find it objectionable and almost painful to look at. The human eye is capable of capturing information within a very wide brightness range, as long as the transition between the dark areas and the bright areas is not too abrupt. The human eye has a fairly wide field of view (peripheral vision) and can capture dark areas and bright areas within the same scene, but the brain adjusts locally to the area of central vision.

This is the case, for instance, when an observer looks at X-ray films. There is often a very wide brightness range between the dark areas and the bright areas of the X-ray film but the observer's brain is capable of locally adjusting the brightness levels to capture the relevant contrast information. This phenomenon occurs as long as the dark areas and the bright areas are not too close to each other (no high-contrast abrupt transition). The nature of medical X-ray images is such that abrupt high-contrast transitions rarely occur, except when metal implants are present. Most high-contrast transitions are fairly gradual, going from the lung region to the mediastinum region of a chest X-ray, for instance.

A typical intensity profile of a medical digital radiograph is shown in FIG. 9. High spatial resolution information is present in dark areas 905 as well as in bright areas 910 of input signal 900. Transition 915 between dark areas 905 and bright areas 910 is gradual.

FIG. 10 indicates the brightness of pixels in one exemplary embodiment of a cascading low spatial frequency and high spatial frequency embodiment of the present invention. Curve 1005 indicates the brightness of pixels in the low spatial frequency image of rear display 315. Curve 1010 indicates the brightness of pixels in the image of front display 325 produced in response to the high spatial frequency image data received from filter 505. Curve 1015 indicates the brightness of pixels of the dual display as perceived by observer 195. As shown on FIG. 10, transition 915 can be reproduced by low-resolution rear display 315. High spatial resolution information in both dark area 905 and bright area 910 can be reproduced by the high-resolution front display because the low spatial resolution component is removed from the digital radiograph. Each display only handles a limited gray scale range (possibly less than 256 gray levels) but the resulting image features a remarkably wide gray scale range, similar to the gray scale range of a traditional X-ray film viewed on a light box.

In order to recreate for the radiologists the "film experience" with the dual stage high-contrast display, it is important to provide the same ease of use that film enjoys. The wide gray scale range allows for a wide latitude of display brightness and therefore alleviates cumbersome software and hardware adjustments radiologists would have to make to reach an acceptable image quality.

Another important feature for ease of use is the viewing angle of the display. In the present invention, the backlight of a high-resolution LCD panel is replaced by a smart backlight (i.e. rear display 315) that dims in dark areas of the image and brightens in bright areas of the image. Unlike a conventional backlight, however, this smart backlight generates fairly collimated light instead of diffused light. In some embodiments of the present invention, a diffuser is placed on or in proximity of the front LCD panel in order to the increase the viewing angle.

Figure 11:
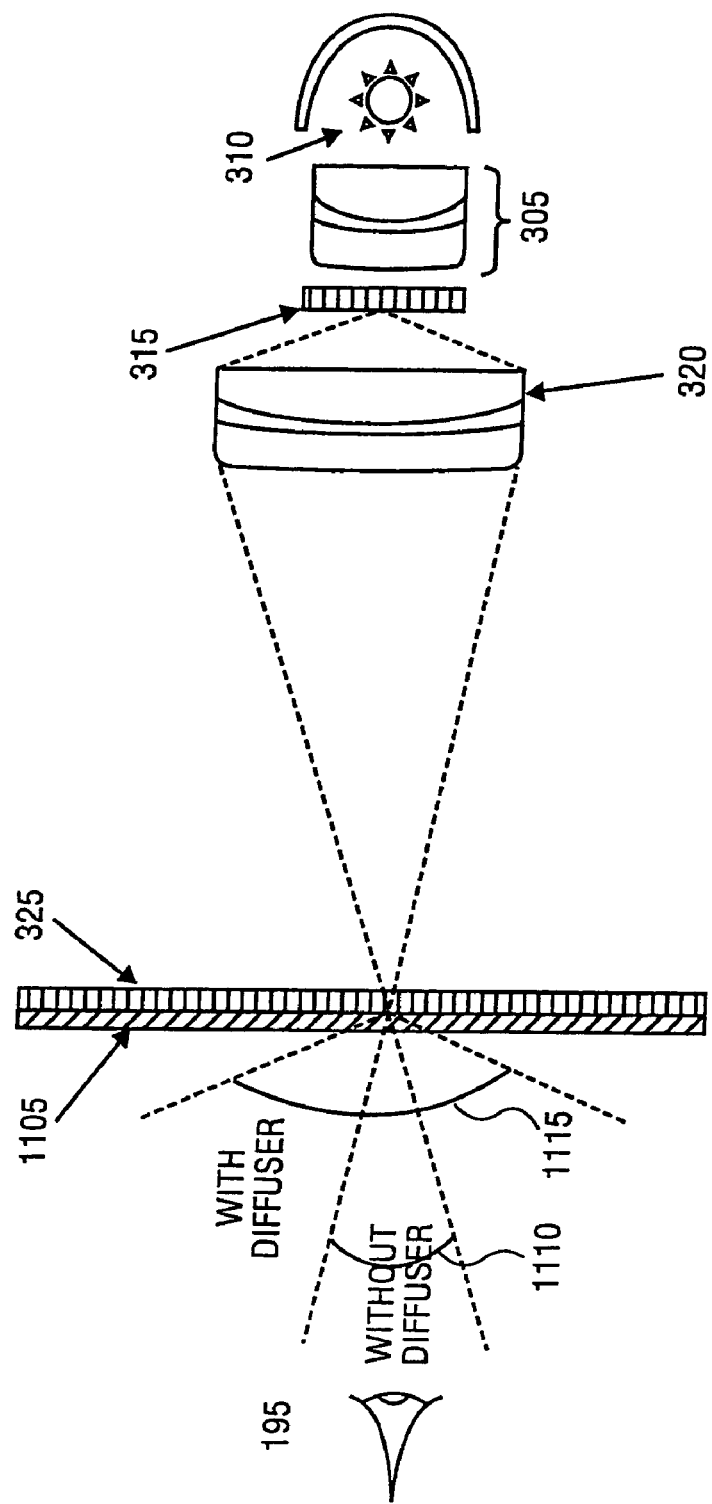
FIG. 11 depicts a display device according to a fourth embodiment of the present invention.

An illustration of this embodiment is shown in FIG. 11. The elements of this embodiment are substantially as shown in FIG. 3 and described above, except for the inclusion of diffuser 1105. Angle 1110 illustrates the relatively narrower viewing angle without diffuser 1105 and angle 1115 indicates the wider viewing angle produced by diffuser 1105.

While the invention has been particularly shown and described with reference to specific embodiments thereof, it will be understood by those skilled in the art that changes in the form and details of the specific embodiments may be made without departing from the spirit or scope of the invention.

I claim:

1. A display apparatus, comprising:
a first display disposed in a first plane, having a first area and configured to generate a first image based upon first image data;
a second display disposed in a second plane, having a second area and configured to generate a second image based upon second image data, the first image data comprising lower spatial frequency content than the second image data; and
a projection device for projecting the first image substantially into the second plane, thereby superimposing a projected image and the second image.

2. The display apparatus of claim 1, wherein the first display comprises a transmissive display panel.

3. The display apparatus of claim 2, wherein the first display comprises a transmissive liquid crystal display panel.

4. The display apparatus of claim 1, wherein the first display comprises a reflective display panel.

5. The display apparatus of claim 3, wherein the reflective display panel comprises a digital light processing device.

6. The display apparatus of claim 1, wherein the projection device comprises an optical low-pass filter.

7. The display apparatus of claim 1, wherein the second display comprises a transmissive liquid crystal display panel.

8. The display apparatus of claim 1, wherein the first area is smaller than the second area.

9. The display apparatus of claim 1, further comprising a filter for removing high spatial frequency components from the first image data.

10. The display apparatus of claim 1, further comprising a diffuser disposed in a third plane proximate the second display.

11. The display apparatus of claim 10, wherein the projection device causes the projected image to focus in the third plane.

12. A display method, comprising the steps of:
generating a first image on a first display based upon first image data;
generating a second image on a second display based upon second image data, the first image data comprising lower spatial frequency content than the second image data; and
projecting the first image substantially into the second plane, thereby superimposing a projected image and the second image.

13. The display method of claim 12, further comprising the step of filtering high spatial frequency data from the first image data.

14. The display method of claim 12, further comprising the step of filtering high spatial frequency data from the first image.

15. The display method of claim 12, further comprising the step of filtering high spatial frequency data from the projected image.

16. A display apparatus, comprising:
a filter for filtering high spatial frequency data and low spatial frequency data from image data;
a first liquid crystal display panel disposed in a first plane, having a first area and configured to generate a first image based upon low spatial frequency data received from the filter;
a second liquid crystal display panel disposed in a second plane parallel to the first plane, having a second area larger than the first area and configured to generate a second image based upon high spatial frequency data received from the filter;
a light source for illuminating a first side of the first liquid crystal display panel; and a projection device disposed proximate a second side of the first liquid crystal display panel for projecting the first image and focusing the first image on the second plane.

17. The display apparatus of claim 16, wherein the projection device comprises a metal halide lamp.

18. The display apparatus of claim 16, wherein an aperture setting of the projection device is greater than f/4 when the projection device projects the first image.

19. The display apparatus of claim 16, wherein the first liquid crystal display panel is configured to receive an eight-bit signal.

20. The display apparatus of claim 16, wherein the second liquid crystal display panel is configured to receive an eight-bit signal.

21. The display apparatus of claim 16, further comprising a diffusing layer disposed upon the second liquid crystal display panel.

22. A display apparatus, comprising:
- a filter for filtering high spatial frequency data and low spatial frequency data from image data;
- a reflective digital light processing device having a first area and configured to generate a first image based upon low spatial frequency data received from the filter;
- a light source for illuminating a first side of the reflective digital light processing device; a transmissive liquid crystal display panel having a second area larger than the first area and configured to generate a second image based upon high spatial frequency data received from the filter; and
- a projection device for projecting a first image from the reflective digital light processing device and for focusing the first image into a plane within which to transmissive liquid crystal display panel is disposed.

23. The display apparatus of claim 22, wherein the projection device comprises a metal halide lamp.

24. The display apparatus of claim 22, wherein an aperture setting of the projection device is greater than f/4 when the projection device projects the first image.

25. The display apparatus of claim 22, wherein the reflective digital light processing device is configured to receive an eight-bit signal.

26. The display apparatus of claim 22, wherein the transmissive liquid crystal display panel is configured to receive an eight-bit signal.

27. The display apparatus of claim 22, further comprising a diffusing layer disposed upon the transmissive liquid crystal display panel.

28. The display apparatus of claim 22, wherein the reflective digital light processing device comprises a digital micromirror device.

29. The display apparatus of claim 28, wherein the digital micromirror device comprises a plurality of pixels and each pixel comprises three separately addressable sub-pixels.

30. A display method, comprising the steps of:
- filtering high spatial frequency data and low spatial frequency data from image data;
- displaying a first image based upon the low spatial frequency data;
- displaying a second image on a liquid crystal display based upon the high spatial frequency data; and
- projecting the first image onto the liquid crystal display such that pixel data from the first image are registered with corresponding pixel data from the second image.

* * * * *

(12) INTER PARTES REEXAMINATION CERTIFICATE (542nd)

United States Patent
Sayag

(10) Number: US 7,002,533 C1
(45) Certificate Issued: Feb. 25, 2013

(54) DUAL-STAGE HIGH-CONTRAST ELECTRONIC IMAGE DISPLAY

(76) Inventor: Michel Sayag, Mountain View, CA (US)

Reexamination Request:
No. 95/000,562, Sep. 17, 2010

Reexamination Certificate for:
Patent No.: 7,002,533
Issued: Feb. 21, 2006
Appl. No.: 10/218,199
Filed: Aug. 13, 2002

Related U.S. Application Data

(60) Provisional application No. 60/313,147, filed on Aug. 17, 2001.

(51) Int. Cl.
*G09G 3/36* (2006.01)
(52) U.S. Cl. ...... 345/7; 345/87; 348/E5.141; 348/E5.142
(58) Field of Classification Search .................. None
See application file for complete search history.

(56) References Cited

To view the complete listing of prior art documents cited during the proceeding for Reexamination Control Number 95/000,562, please refer to the USPTO's public Patent Application Information Retrieval (PAIR) system under the Display References tab.

*Primary Examiner* — Albert J Gagliardi

(57) ABSTRACT

Electronic displays are provided which can reproduce image data with high contrast ratios and a gray scale range comparable to conventional X-ray film viewed on a light box. One such display includes a rear low-resolution LCD or DLP display which projects an image onto a high-resolution LCD display. In such embodiments, the mechanical and optical registration between the two displays is not critical. Therefore, modulation transfer function and distortion of the projection optics are not critical. Accordingly, the brightness of the inventive display can be maximized with high power lamps and high aperture projection optics. Because the display has a high dynamic range, the need for dynamic range compression algorithms is reduced.

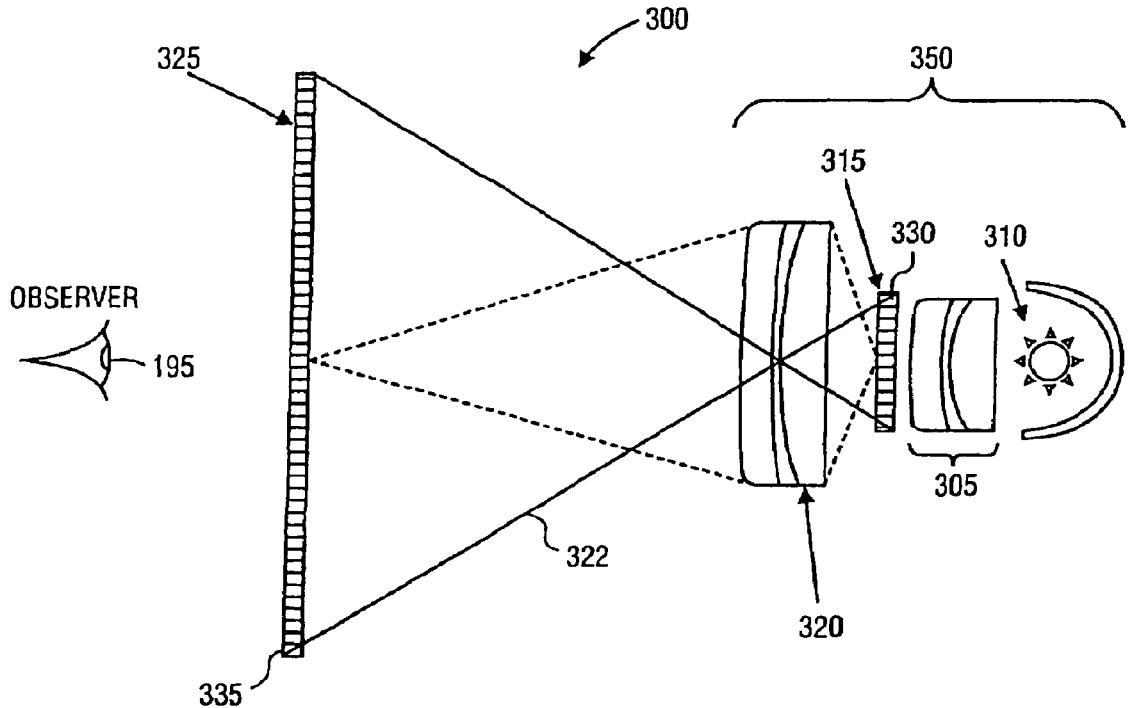

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16-21 is confirmed.

Claims 1-15 and 22-30 are cancelled.

New claims 31 and 32 are added and determined to be patentable.

*31. The display apparatus of claim 9, wherein the filter is configured to replace a first value of a first pixel with a weighted average of the first value and values of a plurality of pixels neighboring the first pixel, the first pixel and the plurality of pixels being associated with the first display, and*

*wherein the projection device includes a layer of material that is configured to change a path of light.*

*32. The display apparatus of claim 1, further comprising a low pass filter configured to blur the first image relative to an original image.*

* * * * *